United States Patent

[11] 3,620,502

| [72] | Inventor | Richard L. Lawson<br>Raleigh, N.C. |
|---|---|---|
| [21] | Appl. No. | 843,022 |
| [22] | Filed | July 18, 1969 |
| [45] | Patented | Nov. 16, 1971 |
| [73] | Assignee | Rockwell Manufacturing Company<br>Pittsburgh, Pa. |

[54] AUTOMATIC LUBRICATION FOR VALVE STEM THREADS
13 Claims, 6 Drawing Figs.

[52] U.S. Cl. ................................................ 251/355
[51] Int. Cl. ......................................... F16k 41/02
[50] Field of Search .......................................... 251/355,
267; 137/246.13, 246.11

[56] References Cited
UNITED STATES PATENTS

| 1,789,340 | 1/1931 | Melling | 251/355 X |
| 2,086,725 | 7/1937 | McCausland et al. | 137/246.13 |
| 2,979,071 | 4/1961 | Herring et al. | 137/246.13 |
| 2,988,172 | 6/1961 | Fry | 137/246.13 X |
| 3,055,632 | 9/1962 | Scaramucci | 251/355 X |
| 3,094,136 | 6/1963 | Bredtschneider et al. | 251/355 X |
| 3,282,287 | 11/1966 | Fowler | 137/246.13 |

Primary Examiner—Samuel Scott
Attorney—Strauch, Nolan, Neale, Nies & Kurz

ABSTRACT: A valve assembly of the type wherein a valve stem operatively connected to a valve closure element is longitudinally moved between open and closed valve positions comprises a longitudinally movable nonrotatable valve stem in threaded engagement with an axially fixed bushing rotatably mounted on said body so that rotation of the bushing in opposite directions effects opposite longitudinal movements of said valve stem. A reservoir of lubricant under pressure is disposed within the stem with passage means extending between said reservoir and an engagement surface zone of the threads. A transverse cylinder on the stem responsive to longitudinal movement of said valve stem in either direction is actuated for automatically feeding lubricant along the passage means from said reservoir toward said zone.

INVENTOR
RICHARD L. LAWSON

BY Strauch Nolan Neale Nies + Kurz
ATTORNEYS

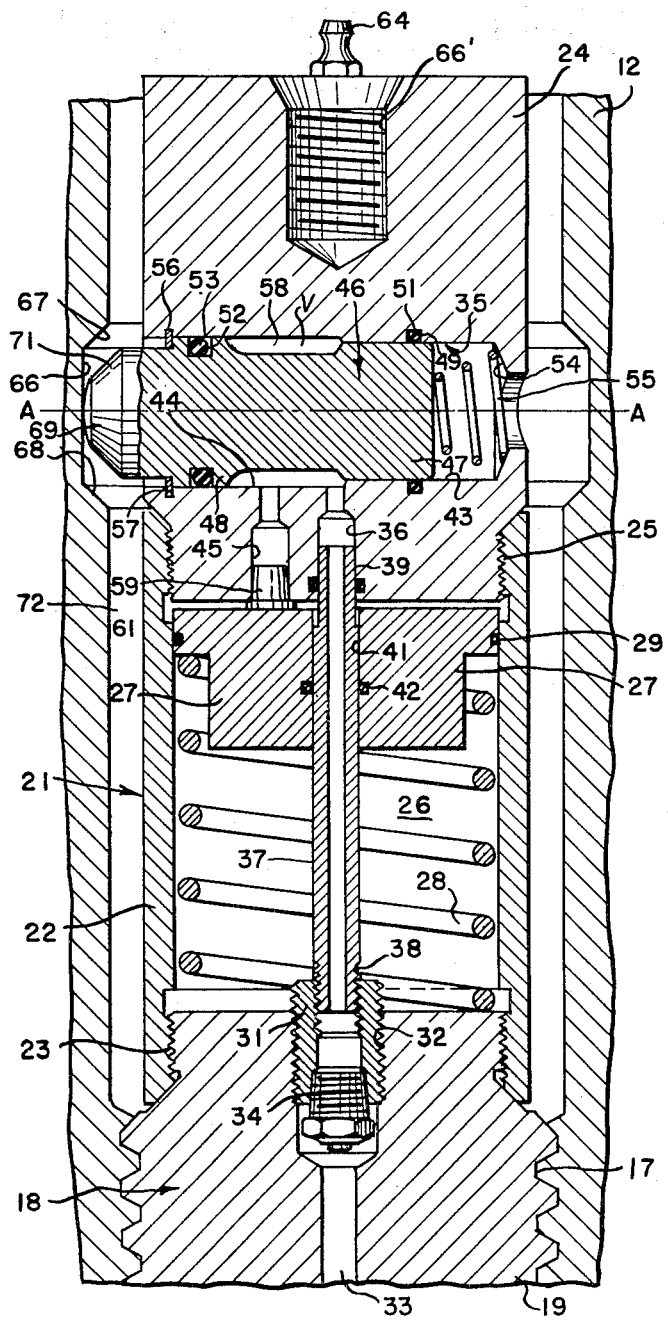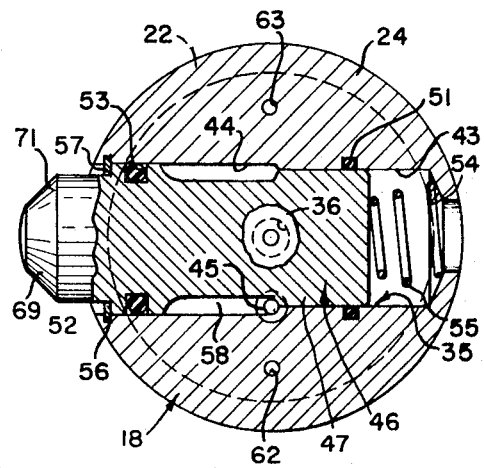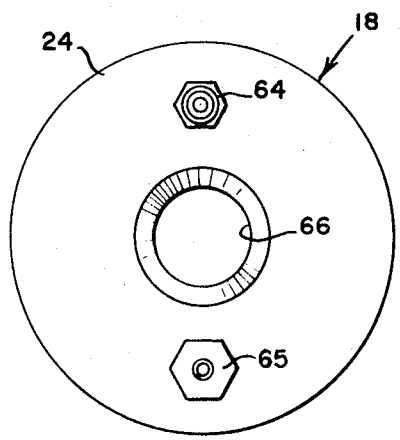
INVENTOR
RICHARD L. LAWSON
BY
Strauch Nolan Neale Nies + Kurz
ATTORNEYS

INVENTOR
RICHARD L. LAWSON

BY Strauch Nolan Neale Nies + Kurz
ATTORNEYS

AUTOMATIC LUBRICATION FOR VALVE STEM THREADS

This invention relates to the lubrication of valve stems of the type that are longitudinally moved to open or close the valve. It has become conventional in valves of this type to obtain longitudinal movement by relative rotation of the stem and a member threadedly connected to it, and because the thread loads are relatively high and the threads may stick due to corrosion or rust lubrication at the threads is important.

For example, the stem may be formed with a threaded portion rotatably engaged within the internally threaded bore of an axially fixed rotatably mounted yoke bushing, so that when the bushing is rotated as by a handwheel or a suitable operator mechanism the stem is shifted longitudinally in a direction depending upon the direction of rotation of the bushing. The stem is suitably held against rotation about its axis by means permitting its range of longitudinal displacement. A valve of this general type is disclosed for example in MacGregor U.S. Pat. No. 2,665,875.

As disclosed in said MacGregor patent manual lubrication to the threads has been used. However much depends upon periodic attention by workmen and since many of these valves are operated only infrequently carelessness and neglect may result in corroded or frozen valve stems.

The invention solves the problem by providing for automatic lubrication whereby passage means leading to the engaged threads is maintained filled with lubricant under pressure and wherein whenever the valve is actuated to either open or closed condition a charge of lubricant is automatically fed under increased pressure into the threaded region, and this is a major object of the invention.

Automatic lubrication of valve stem threads incidental to operation of the valve between open and closed positions has been proposed, and such an arrangement for adaptation to a gate valve is disclosed in Milleville, U.S. Pat. No. 3,226,081. The present invention is applicable to any valve having a longitudinally movable stem, including those disclosed in the MacGregor and Milleville patents, and as will appear the invention distinguishes over such patent disclosures by providing a special novel useful reliable automatic thread lubrication structure and operation.

More specifically the invention contemplates a valve assembly wherein the longitudinally movable threaded stem contains a lubricant reservoir for dispensing lubricant under substantially constant pressure through a passage system to the threaded engagement region between the stem and bushing and a piston is provided on the stem that is actuated whenever the valve is opened or closed to temporarily increase the lubricant pressure in the passage system, and this is a further object of the invention.

Other and more specific objects of invention include novel stem reservoir arrangements, and novel piston controlled passage system arrangements as will appear from the following description and claims and the accompanying drawings.

BRIEF DESCRIPTION OF DRAWINGS

FIG. 2 is an enlarged fragmentary view in section showing further details of the stem thread lubrication system;

FIG. 3 is a top plan view of the valve stem;

FIG. 4 is a transverse section through the valve stem at the piston, showing the lubricant passages;

PREFERRED EMBODIMENTS

Figure 1:
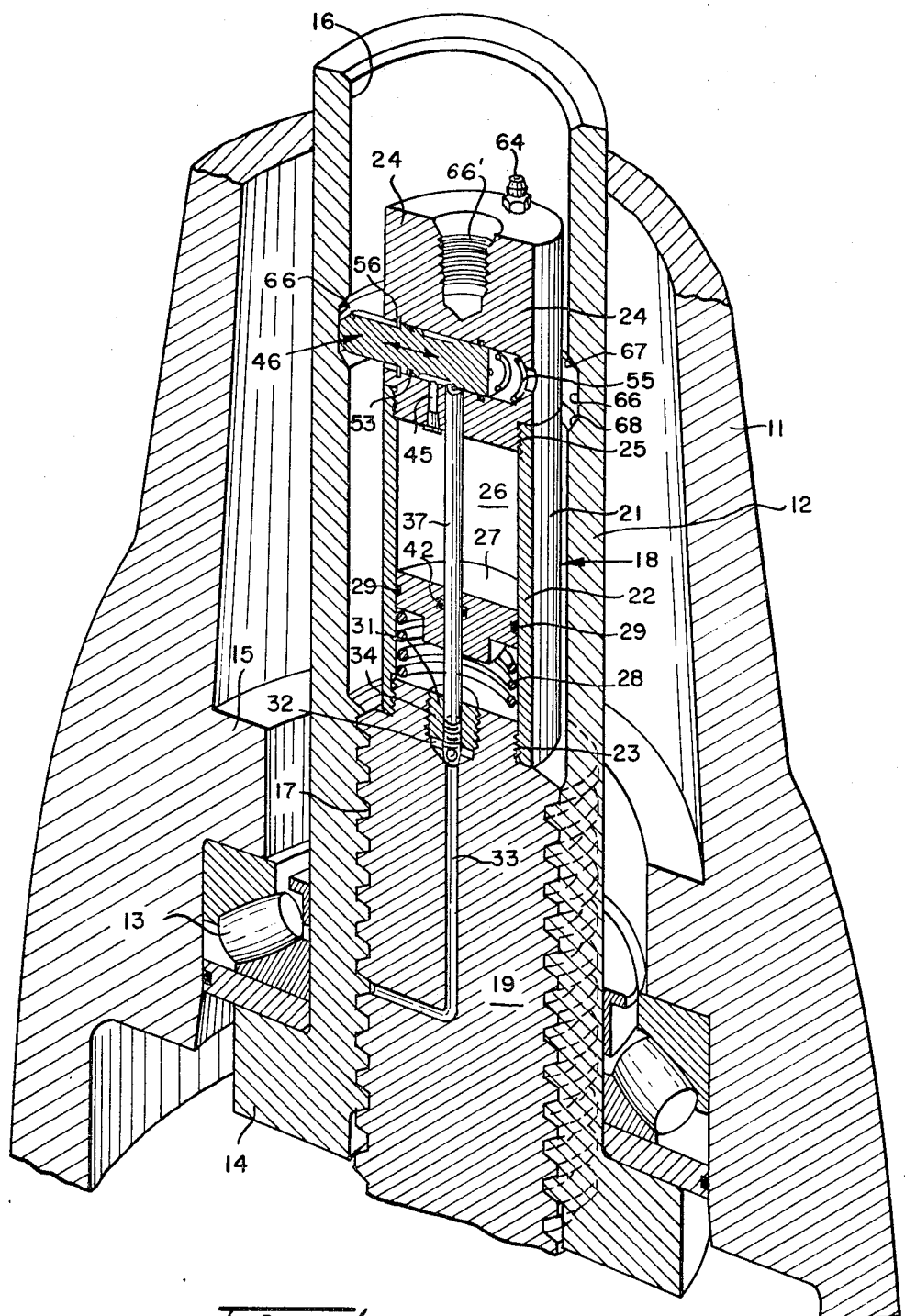
FIG. 1 is a fragmentary view partly broken away and in section illustrating the invention according to a preferred embodiment.

Referring to FIGURE 1, a yoke 11 is suitably fixed to the valve body (not shown). A tubular yoke bushing 12 is rotatably mounted within the yoke as by a roller bearing unit 13 interposed between an external annular flange 14 at the lower end of the bushing and an internal annular flange 15 on the yoke. While bushing 12 is rotatable about its vertical axis, it is suitably axially fixed in the valve assembly.

Yoke bushing 12 is formed with an internal through bore 16 that is threaded at 17 at its lower end. A valve stem 18 has a threaded section 19 rotatably mounted in the threaded section of the bushing bore, and comprises a hollow lubricant reservoir and pump section 21 within bore 16 above the threaded section. Valve stem 18 is suitably maintained against rotation about its axis as by a holding collar such as disclosed in the MacGregor patent or a valve closure element connected to its lower end as disclosed in Milleville patent.

As shown in FIGS. 1 and 2, stem 18 is preferably solid at the threaded section, and the section 21 comprises a hollow tube 22 fixed as by a lower threaded connection 23 to section 19 and a relatively solid head 24 fixed as by a threaded connection 25 to the upper end of tube 22.

Tube 22 surrounds a longitudinally cylindrical stem reservoir chamber 26 in which a plunger 27 is slidably mounted. A coil spring 28 compressed between the bottom of the chamber and plunger 27 biases the plunger toward the upper end of the chamber. Plunger 27 is peripherally grooved at 29 to mount a resilient O-ring seal with the chamber wall.

A hollow adapter fitting 31 is screw-threaded into a bore 32 in the bottom wall of chamber 26. As shown in FIG. 2, the lower end of bore 32 is connected by passage 33 through the threaded stem section to the engaged threads between the yoke bushing and the stem. While only one radial outlet to the threads is shown, as many as needed are provided to provide uniformly distributed lubricant at the thread interface.

A unidirectional check valve unit 34 is mounted on the lower end of adapted 31 within bore 32. Check valve 34 passes fluid lubricant toward passage 33 but blocks return flow for a purpose to appear.

Stem head 24 is formed with a transverse through bore 35 symmetrical about a diameter, and an axial bore 36 that connects bore 35 with the upper end of chamber 26. A small diameter rigid tube 37 extends vertically centrally through chamber 26, with its lower end fixed within adapter 31 as by the threaded connection 38 and its upper end fixed in head bore 36 as by a similar thread or press fit at 39.

Plunger 27 is centrally apertured at 41 for a slide guidefit with tube 37, and a resilient O-ring seal 42 is provided between the tube and plunger.

Figure 5:
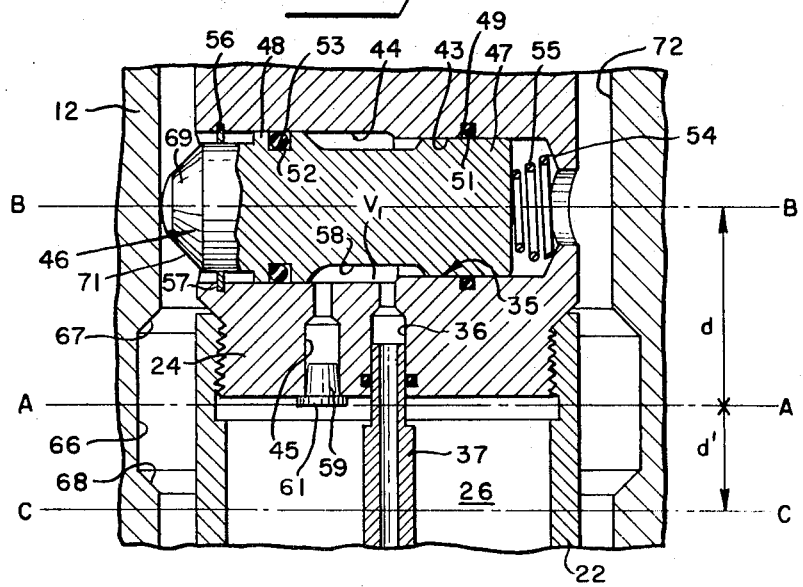
FIG. 5 is an enlarged fragmentary view showing the piston at the end of a lubricant feed stroke.

Transverse bore 35 comprises a small diameter end section 43 and a large diameter end section 44. Preferably bore 36 intersects bore 35 at the axial juncture of bore sections 43 and 44 as shown in FIG. 5. A small diameter head bore 45 parallel to bore 36 extends between chamber 26 and the small diameter bore section 44.

A piston 46 has a small diameter section 47 slidable in small bore section 43 and a large diameter section 48 slidable in small bore section 44. The bore wall is grooved at 49 to mount a resilient O-ring seal 51 with the small diameter section of the piston, and the piston is grooved at 52 to mount a resilient O-ring seal 53 within the large diameter bore section 44.

At one end bore 35 is reduced to form an internal shoulder 54, and a spring 55 is compressed between shoulder 54 and piston 46. At the other end bore 35 has an internal projection 56 in the form of a snapring seated in annular groove 57, and ring 56 forms a stop toward which the plunger is biased by spring 55 as shown in FIG. 2. Ring 56 also serves to hold piston 46 in assembly with stem 18 when the valve is disassembled.

Intermediate its ends piston 46 is formed with an annular recess 58 that longitudinally bridges the small and large diameter sections and is long enough to bridge the open ends of both head bores 36 and 45 in all operative positions of the piston as will appear.

A unidirectional valve unit 59 is mounted in head bore 45 such that lubricant flow may take place from chamber 26 through bore 45 but not in the opposite direction. The lower end 61 of valve unit 59 preferably projects into space 26 a short distance for the purpose of limiting upward displacement of plunger 27 for a purpose to appear.

Figure 6:
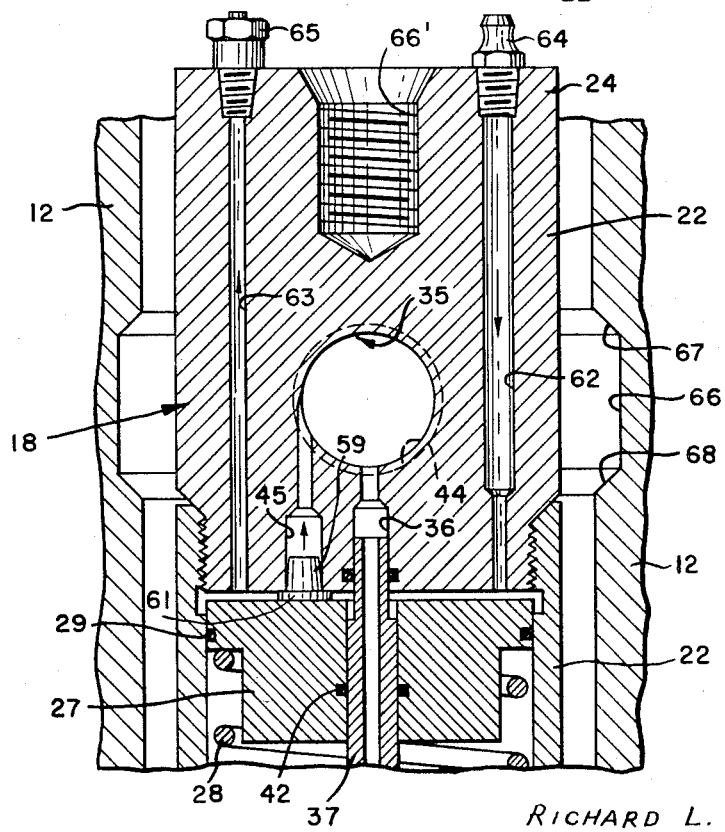
FIG. 6 is an enlarged fragmentary view in longitudinal section showing lubricant passages.

Referring to FIG. 6, parallel longitudinal through passages 62 and 63 are provided in stem head 24, both opening at their lower ends into chamber 26 above plunger 27. At its upper end passage 62 mounts a unidirectional check valve unit 64, which is preferably a conventional grease inlet fitting, that enables lubricant under pressure to be supplied through inlet passage 62 to the reservoir as will appear.

At its upper end passage 63 mounts a unidirectional relief valve unit 65 that outwardly discharges lubricant whenever the pressure in relief passage 63 exceeds a predetermined value.

Head 24 is formed with an upwardly open threaded bore 66', for receiving a threaded tool when removal of the valve stem is desired.

A grease gun may be applied to fitting 64 to discharge lubricant under pressure through passage 62 into chamber 26 above the plunger 27 thereby displacing plunger 27 downwardly from the FIG. 2 position toward the FIG. 1 position where spring 28 is energized in compressed condition. This will fill the reservoir space above plunger 27 with the lubricant under pressure.

Referring to FIGS. 5 and 6, this lubricant under pressure will also pass up through unidirectional valve 59 and passage 45, along the annular recess space at 58 and down passage 36 and tube 37 is to be discharged through fitting 34 into passage or passages 33 which conducts it to the threads at 27 to be lubricated. Passage 63 will also be filled with lubricant up to relief valve 65. When these passages are filled with lubricant and plunger 27 has been displaced to the FIG. 1 position with chamber 26 above it filled with lubricant, any increase in lubricant pressure above a certain amount will result in discharge through relief valve 65. This informs the operator that the system is properly filled with lubricant and in energized condition for automatic lubrication operation.

Referring to FIGS. 1, 2 and 5 the yoke bushing 12 surrounding stem 18 is internally formed with an annular cam groove 66 having upper and lower annular cam surfaces 67 and 68 respectively. Cam surfaces 67 and 68 are parallel and coaxial with the vertical axis of longitudinal displacement of valve stem 18, and are oppositely inclined, diverging toward the valve stem.

Cam groove 66 is of such radial depth that when piston 46 is spring projected to its outward limit, as determined, by stop 56 and as shown in FIG. 2, the substantially conical tip 69 of piston 46 is disposed well within groove 66. The conical cam surface 71 of piston tip 69 preferably inclines at an angle equal to the angles of inclination of axially fixed cam surfaces 67 and 68.

The internal wall 72 of bushing 12 above and below groove 66 is cylindrical, whereby when stem 18 has been longitudinally displaced relative to the bushing as for example shown in FIG. 5 the piston will be automatically shifted inwardly a predetermined amount, for a purpose to appear.

OPERATION

The lubricant reservoir space in chamber 26 above plunger 27 is filled with lubricant under substantially constant pressure as above described. Now plunger 27 is substantially in the FIG. 1 position and spring 28 is fully energized. The operation of filling the reservoir to provide a substantially constant pressure source of lubricant in the valve stem 18 is independent of the automatic lubricating operation as will become apparent.

Valve stem 18 is displaced longitudinally in opposite directions by opposite rotation of yoke bushing 12 about their common vertical axis, as by a hand wheel or some other operating device (not shown) connected to the bushing. Bushing 12, although rotatable, remains fixed axially.

Normally stem 18 is either in a lowered position relative to bushing 12 wherein the valve closure element (not shown) connected to it is in fully closed position in the flow path or in a raised position relative to bushing 12 wherein the valve closure element is disposed out of the flow path. For example the raised position of stem 18 shown in FIG. 5 may correspond to the valve open FIG.

For purposes of explanation, the stem 18 is shown in FIGS. 1 and 2 in an intermediate longitudinal position at a level A—A designated in FIG. 2, wherein the piston 46 is fully extended into groove 66. It will be understood that normally the stem 18 will be in such position that the piston 46 is either a certain distance $d$ above groove 66 and retracted by engagement with bushing wall 72, this valve open position being shown in FIG. 5 at level B—B, or a corresponding distance $d^1$ below groove 66 at the level indicated at C—C wherein the valve would be closed.

In any event, groove 66 and piston 46 are so relatively longitudinally located that whenever the valve is either opened or closed the piston will move longitudinally across groove 66.

For example, starting with the valve open and stem 18 is raised at level B—B shown in FIG. 5, rotation of yoke 12 will displace stem 18 downwardly with piston 46 being held displaced into bore 35 by sliding engagement of tip 69 with bushing surface 72 until the piston reaches groove 66. At this time the piston will be displaced outwardly by spring 55 until stopped by ring 56 with its tip in groove 66. Then when the piston 46 on the descending stem 18 reaches the lower end of groove 66 engagement of tip surface 71 with cam surface 68 will displace the plunger back into bore 35 with its tip riding along surface 72. The reverse operation takes place when the stem is moved upwardly.

Whenever piston 46 is displaced inwardly into bore 35, a passage system in the stem downstream of the piston is subjected to increased pressure and a fresh supply of lubricant is automatically fed into threads 27. This takes place because of the difference in diameter between bore sections 43 and 44.

Referring to FIG. 2 which shows the piston 46 extended into groove 66 it will be seen that annular recess 58 provides a bridging passage space indicated at V between head passages 45 and 36, and that this space V is of known volume with a uniform radial dimension equal to that of recess 58.

When piston 46 has been displaced inwardly, as to the FIG. 5 position, the annular recess 58 still provides a bridging passage between head passages 45 and 36 but the volume $V^1$ of this space is less than volume V, whereby some of the lubricant of volume V has been displaced out of the recess 58 into the passage system leading to the thread 27. Since lubricant cannot flow downwardly in passage 45 due to check valve 59 this displacement of lubricant out of recess 58 takes place only into passage 36 and therefore results in automatic feed of a charge of new lubricant into the threaded region at 27.

Thus whenever the valve is open or closed the piston 46 is actuated to pump further lubricant into the threaded region at 27.

During outward projection of piston 46 into groove 66, lubricant is displaced from the reservoir upwardly through check valve 59 to replace that displaced into passage 36. Spring 28 maintains constant lubricant pressure at the reservoir.

Check valve 34 prevents lubricant in passage 33 from being fed into tube 37 when the piston 46 is extended.

During the periods that the valve is not being opened or closed, plunger 27 maintains substantially constant pressure in the passage system leading to threaded region 27 to tend to compensate for leakage at the threads. This constant reservoir pressure however must not be very high because due to the tolerances involved high lubricant pressure might empty the reservoir in a short period and undesirably dissipate the lubricant. In the invention the reservoir pressure of the lubricant, that is the pressure exerted by spring 28, is fairly low so that there is no undue dissipation of lubricant during nonoperational periods of the valve, and the lubricant pressure in the stem passage system leading to the threads 27 is periodically greatly multiplied each time the piston 46 is displaced inwardly of bore 35 so that lubricant is positively forced into the thread interfaces at high pressure whenever the valve is actuated.

The invention provides increased yoke bushing-stem thread life and minimum of lubricant dissipation.

I claim:

1. In a valve assembly of the type wherein a valve stem operatively connected to a valve closure element is longitudinally moved between open and closed valve positions, said assembly comprising a valve body for containing said element, a longitudinally movable externally threaded valve stem, an axially fixed bushing rotatably mounted on said body and having internal threads rotatably engaged with the valve stem threads so that opposite rotation of said bushing effects corresponding opposite longitudinal movement of said valve stem, means providing a reservoir of lubricant, passage means between said reservoir and an engagement surface zone of said threads, said reservoir and said passage means being provided within said valve stem, and means comprising means for maintaining the lubricant in said reservoir under continuous pressure and responsive to longitudinal movement of said valve stem in either direction for automatically feeding lubricant from said reservoir toward said zone during successive opening and closing operations of the valve.

2. In the valve assembly defined in claim 1, cooperative means on said bushing and stem for operating said automatic feeding means.

3. In the valve assembly defined in claim 1, said means providing the reservoir comprising an enclosure adapted to contain a body of said lubricant and having a spring biased movable wall, and said passage means including a unidirectional valve permitting displacement of lubricant out of said body.

4. In the valve assembly defined in claim 3, said lubricant feeding means comprising pump means in said passage means disposed between said unidirectional valve and said zone.

5. In a valve assembly of the type wherein a valve stem operatively connected to a valve closure element is longitudinally moved between open and closed valve positions, said assembly comprising a valve body for containing said element, a longitudinally movable externally threaded valve stem, an axially fixed bushing rotatably mounted on said body and having internal threads rotatably engaged with the valve stem threads so that opposite rotation of said bushing effects corresponding opposite longitudinal movement of said valve stem, means providing a reservoir of lubricant under pressure within said valve stem, passage means between said reservoir and an engagement surface zone of said threads, and means responsive to longitudinal movement of said valve stem in either direction for automatically feeding lubricant from said reservoir toward said zone, said reservoir comprising a chamber within said stem, a plunger slidably mounted in said chamber, means for introducing lubricant under pressure into said chamber at one side of said plunger to provide a body of pressurized lubricant therein, and resilient means compressed by displacement of said plunger in one direction when the lubricant is being introduced for biasing said plunger in the other direction.

6. In the valve assembly defined in claim 5, said means for automatically feeding lubricant comprising automatic pumping means in said passage means actuated by longitudinal displacement of said stem.

7. In a valve assembly of the type wherein a valve stem operatively connected to a valve closure element is longitudinally moved between open and closed valve positions, said assembly comprising a valve body for containing said element, a longitudinally movable externally threaded valve stem, an axially fixed bushing rotatably mounted on said body and having internal threads rotatably engaged with the valve stem threads so that opposite rotation of said bushing effects corresponding opposite longitudinal movement of said valve stem, means providing a reservoir of lubricant under pressure within said stem, passage means between said reservoir and an engagement surface zone of said threads, and means responsive to longitudinal movement of said valve stem in either direction for automatically feeding lubricant from said reservoir toward said zone comprising automatic pumping means in said passage means actuated by longitudinal displacement of said stem, said pumping means comprising a transverse cylinder in said stem containing a spring biased reciprocable piston, said piston being displaceable toward two limit positions in said cylinder and being operative when moving in one direction to displace lubricant along said passage means toward said zone and being operable when moving in the other direction to admit lubricant from said reservoir into said cylinder.

8. In the valve assembly defined in claim 7, said bushing having an internal surface rotatably slidably engaging the outer end of said piston for maintaining said piston displaced inwardly of said cylinder, and said bushing having an internal groove for permitting limited outward projection of said piston when said piston and groove become longitudinal aligned.

9. In the valve assembly defined in claim 8, said groove having cam edges at opposite sides for engaging the end of said piston.

10. In the valve assembly defined in claim 7, said passage means comprising a first passage section between said reservoir and said cylinder and a second passage section between said cylinder and said zone.

11. In the valve assembly defined in claim 10, a unidirectional check valve in said first passage section preventing passage of lubricant back into said reservoir.

12. In the valve assembly defined in claim 10, a unidirectional check valve in said second section preventing passage of lubricant toward said cylinder.

13. In the valve assembly defined in claim 10, said cylinder and piston having respective small and large diameter regions in slidable contact, and said piston having an annular peripheral recess located between said regions and bridging said first and second passage sections in all operative positions of said piston.

* * * * *